US007693363B2

(12) United States Patent
Dionne et al.

(10) Patent No.: US 7,693,363 B2
(45) Date of Patent: Apr. 6, 2010

(54) PLASMOSTOR: A-METAL-OXIDE-SI FIELD EFFECT PLASMONIC MODULATOR

(75) Inventors: Jennifer A. Dionne, Albany, CA (US);
Kenneth A. Diest, Pasadena, CA (US);
Luke Sweatlock, Redondo Beach, CA (US); Harry A. Atwater, S. Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 12/410,419

(22) Filed: Mar. 24, 2009

(65) Prior Publication Data
US 2009/0273820 A1 Nov. 5, 2009

Related U.S. Application Data

(60) Provisional application No. 61/070,523, filed on Mar. 24, 2008, provisional application No. 61/132,831, filed on Jun. 23, 2008.

(51) Int. Cl.
*G02B 6/12* (2006.01)
(52) U.S. Cl. ............... 385/14; 385/4; 385/6; 385/8; 359/237; 359/245; 359/246; 359/248
(58) Field of Classification Search ................ 385/4, 385/6, 8, 14; 359/237, 245, 246, 248
See application file for complete search history.

(56) References Cited

U.S. PATENT DOCUMENTS 6,863,382 B2 * 3/2005 Anagnostopoulos et al. .. 347/70
7,330,369 B2 * 2/2008 Tran ........................... 365/151

* cited by examiner

*Primary Examiner*—Jennifer Doan
(74) *Attorney, Agent, or Firm*—Milstein Zhang & Wu LLC; Joseph B. Milstein (57) ABSTRACT

The invention is a system and method for performing all-optical modulation. A semiconductor layer having a defined thickness has an insulator adjacent one surface of the semiconductor. Conductive layers are provided adjacent the semiconductor layer and the insulator. A photodetector is provided to generate an electric field across the conductive layers in response to an input optical gate signal. An input optical signal is modulated by interaction with a plasmon wave generated at the semiconductor/conductive layer interface. By defining the thickness of the semiconductor layer, a desired wavelength of light supports the plasmon waves. Operation of the all-optical modulator requires the provision of an input optical signal of a desired wavelength and the provision of a gate optical signal. An output optical signal is recovered and can be used to store, display or transmit information, for example over a fiber optic communication system, such as a telecommunication system.

20 Claims, 8 Drawing Sheets

PLASMOSTOR: A-METAL-OXIDE-SI FIELD EFFECT PLASMONIC MODULATOR

CROSS-REFERENCE TO RELATED APPLICATIONS

This application claims priority to and the benefit of U.S. provisional patent application Ser. No. 61/070,523, filed Mar. 24, 2008, and U.S. provisional patent application Ser. No. 61/132,831, filed Jun. 23, 2008, each of which applications is incorporated herein by reference in its entirety.

STATEMENT REGARDING FEDERALLY FUNDED RESEARCH OR DEVELOPMENT

The U.S. Government has certain rights in this invention pursuant to Grant No. FA9550-04-1-0434 awarded by the Air Force Office of Scientific Research (AFOSR).

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention relates to optical modulators in general and particularly to an optical modulator that employs silicon (Si) as an active medium in a plasmonic device.

2. Description of Related Art

The integrated circuits ubiquitous in modern technology were critically enabled by the invention of the metal-oxide-semiconductor field effect transistor (MOSFET)—a three terminal device that modulates current flow between a source and drain via an applied electric field. Since the first successful demonstration of MOSFETs in the 1960's, silicon devices and circuits have continuously scaled according to Moore's law, increasing both the integration density and bandwidth of complementary metal-oxide-semiconductor (CMOS) networks. At present, microprocessors contain over 800 million transistors clocked at 3 GHz, with transistor gate lengths as small as 35 nm. Unfortunately, as gate lengths approach dimensions measured in single nanometers, MOS scaling is accompanied by increased circuit delay and higher electronic power dissipation. This is a substantial problem for Moore's Law which often referred to as the "interconnect bottleneck."

To circumvent the electrical and thermal parasitics associated with MOS scaling, new interconnect technologies are being considered by various groups. Particular attention has been given to optical technologies, which could achieve high integration densities without significant electrical limitations. On-chip optical components would offer a substantially higher bandwidth, a lower latency, and a reduced power dissipation compared with electronic components. Unfortunately, optical components are generally bulky relative to CMOS electronic devices, comprising dimensions on the order of the signal wavelength.

The use of plasmonic components offers a unique opportunity for addressing the size mismatch between electrical and optical components. Plasmonic devices convert optical signals into surface electromagnetic waves propagating along metal-dielectric interfaces. Because surface plasmons exhibit extremely small wavelengths and high local field intensities, optical confinement can scale to deep subwavelength dimensions in plasmonic structures.

Recent reports have demonstrated passive and active plasmonic components that combine low optical loss with high mode confinement. Metal-dielectric channels and metal-insulator-metal slot structures have formed the basis for subwavelength plasmonic waveguides, interferometers, and resonators. In addition, plasmon modulators based on quantum dots, ferroelectric materials, or liquid crystals have been proposed and demonstrated. Unstrained silicon exhibits an indirect bandgap and no linear electro-optic effect, yielding a continuous-wave optical response that is typically either slow or weak. To date, neither a Si-based plasmonic waveguide nor a plasmonic Si-based modulator have been demonstrated.

There is a need for plasmonic devices having Si as the active medium in order to integrate standard Si-based electronics with Si-based photonics, and to allow for compatibility with standard CMOS processing techniques and the potential for integration into existing Si-based photonic networks.

SUMMARY OF THE INVENTION

In one aspect the invention relates to a two terminal optical apparatus. The apparatus comprises a substrate configured to support a semiconductor membrane having a thickness defined by a first surface and a second surface, the first surface and the second surface oriented in substantially parallel configuration; the semiconductor layer having an optical input terminal for an input optical signal and an optical output terminal for an output optical signal; a dielectric layer having a thickness defined by a first surface and a second surface, the first surface and the second surface oriented in substantially parallel configuration, the second surface of the dielectric layer adjacent the first surface of the semiconductor membrane, the second surface of the dielectric layer and the first surface of the semiconductor membrane configured to provide an interface capable of supporting a plasmonic wave; a first conductive layer adjacent the first surface of the dielectric layer, the first conductive layer configured as an electric contact; and a second conductive layer adjacent the second surface of the semiconductor layer, the second conductive layer configured as an electric contact. The optical apparatus is configured carry a plasmonic wave in response to the application of an electrical signal across the first conductive layer and the second conductive layer and the application of an input optical signal at the optical input terminal and to provide a modulated optical signal as the output optical signal at the optical output terminal.

In one embodiment, the semiconductor membrane comprises silicon. In one embodiment, the thickness of the semiconductor membrane is configured to select a wavelength of light to have a desired plasmonic response. In one embodiment, the wavelength of light selected to have a desired plasmonic response is a wavelength of light used in communication by way of an optical fiber. In one embodiment, the wavelength of light used in communication by way of an optical fiber is a selected one of 1310 nm, 1480 nm and 1550 nm.

In one embodiment, the dielectric layer comprises silicon and oxygen. In one embodiment, at least one of the first conductive layer and the second conductive layer further comprise an opening defined therein, the opening in the conductive layer configured to provide a selected one of an optical input terminal and an optical output terminal.

The invention also provides a three terminal optical apparatus, that comprises the two terminal optical apparatus, and further comprises a third optical terminal configured as a gate optical input for a gate signal representing information; a photodetector configured to receive the gate optical signal from the third optical terminal, the photodetector configured to apply an electrical signal responsive to the gate optical signal across the first conductive layer and the second conductive layer; and a resistor in parallel with the terminals of the photodetector.

In another aspect, the invention features a method of modulating an optical signal. The method comprises the steps of providing a three terminal optical apparatus having a substrate configured to support a semiconductor membrane having a thickness defined by a first surface and a second surface, the first surface and the second surface oriented in substantially parallel configuration; the semiconductor layer having an optical input terminal for an input optical signal and an optical output terminal for an output optical signal; a dielectric layer having a thickness defined by a first surface and a second surface, the first surface and the second surface oriented in substantially parallel configuration, the second surface of the dielectric layer adjacent the first surface of the semiconductor membrane, the second surface of the dielectric layer and the first surface of the semiconductor membrane configured to provide an interface capable of supporting a plasmonic wave; a first conductive layer adjacent the first surface of the dielectric layer, the first conductive layer configured as an electric contact; a second conductive layer adjacent the second surface of the semiconductor layer, the second conductive layer configured as an electric contact; a third optical terminal configured as a gate optical input for a gate signal representing information; a photodetector configured to receive the gate optical signal from the third optical terminal, the photodetector configured to apply an electrical signal responsive to the gate optical signal across the first conductive layer and the second conductive layer; and a resistor in parallel with the terminals of the photodetector. The method includes the steps of applying a gate signal representing information to the third optical terminal; applying to the optical input terminal an input optical signal to be modulated; and retrieving an output optical signal representing the input optical signal modulated with the information.

In one embodiment, the input optical signal has a wavelength of light used in communication by way of an optical fiber. In one embodiment, the input optical signal has a wavelength selected from the group consisting of 1310 nm, 1480 nm and 1550 nm. In one embodiment, the gate signal representing information comprises information provided by a user.

In one embodiment, the user is a person. In one embodiment, the user is an apparatus based on a general purpose computer programmed with software.

In one embodiment, the method further comprises the step of transmitting the retrieved output optical signal by way of an optical fiber.

In one embodiment, the method further comprises the step of storing the retrieved output optical signal for later use.

In one embodiment, the method further comprises the step of displaying the retrieved output optical signal to a user.

In one embodiment, the modulation is performed at frequencies up to 3 GHz. In one embodiment, the modulation is performed at frequencies up to 15 GHz. In one embodiment, at least one of the input optical signal and the output optical signal is communicated to or from the three terminal optical apparatus, respectively, by way of a telecommunication system.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Ultracompact silicon-compatible modulators, ideally comprising dimensions, materials, and functionality similar to electronic complementary metal-oxide-semiconductor (CMOS) components are expected to be useful to provide chip-based all-optical and optoelectronic computational networks. We have demonstrated such a modulator, based on field-effect modulation of plasmon waveguide modes in a MOS geometry. Near-infrared transmission between an optical source and drain is controlled by a gate voltage that drives the MOS into accumulation. Using the gate oxide as an optical channel, electro-optic modulation is achieved in device volumes of half of a cubic wavelength with femtoJoule switching energies and the potential for GHz modulation frequencies. Modulation has been observed in devices with channel areas (length×thickness) as small as $0.01\lambda^2$, with sub-nanosecond switching speeds.

We present a demonstration of a field effect Si modulator based on multimode interferometry in a plasmonic waveguide. Like the Si-based modulators implemented by Lipson and colleagues (Xu, Q., Schmidt, B., Pradhan, S., & Lipson, M., *Nature* 2005, 435, 325-327), this device utilizes high optical mode confinement to enhance electro-optical nonlinearities in Si. Moreover, like the Si optical modulator of Liu and colleagues (Liu, A., et al. *Nature* 2004, 427, 615-618 (2004)), this device exploits the fast modulation of accumulation conditions in a metal-oxide-semiconductor (MOS) capacitor. In contrast with these and related structures (see Liu, J., et al., *Nature Photonics* 2008, 2, 433-437 (2008)), our plasmonic modulator can achieve modulation ratios approaching 10 dB in device volumes of half a cubic wavelength. In particular, our device illustrates that conventional scaled MOSFETs can operate as optical modulators, by transforming the channel oxide into a plasmon slot waveguide.

Figure 1:
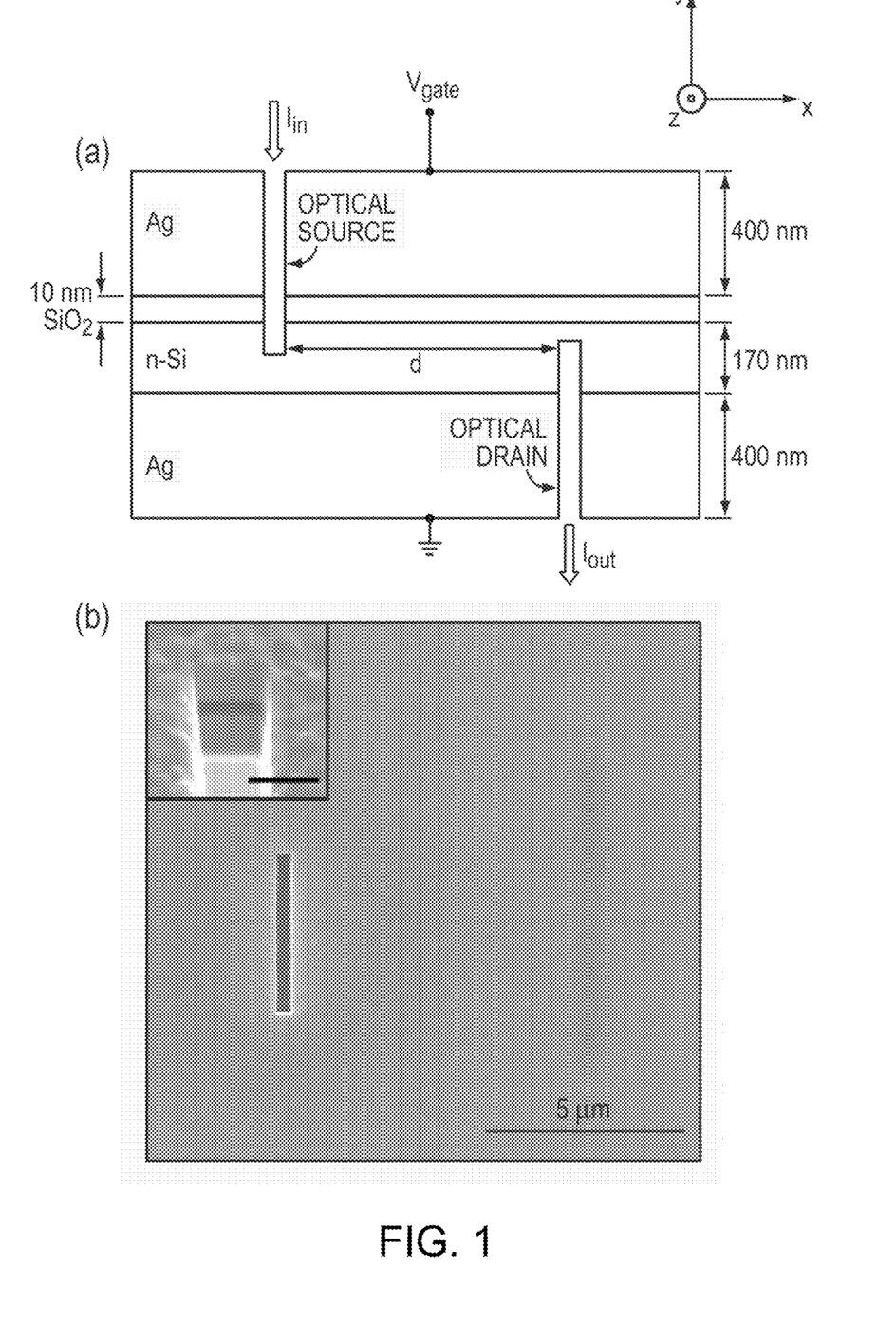
FIG. 1(a) is a cross-sectional diagram that illustrates an exemplary geometry of a Si field effect plasmonic modulator (PlasMOStor), according to the invention.
FIG. 1(b) is a scanning electron micrograph of the PlasMOStor as viewed from the optical source side.

FIG. 1(*a*) illustrates in cross-section the geometry of our plasmonic MOS modulator, called a "PlasMOStor." As seen in FIG. 1(*a*), the modulator consists of a 4-layer metal-oxide-Si-metal waveguide. The plasmostor was prepared from single-crystalline, n-doped Si-on-insulator wafers. Using standard etching and oxidation techniques, a large cm-scale suspended Si membrane was fabricated with a uniform thickness of approximately 170 nm and carrier concentrations of $\sim 9 \times 10^{16}/cm^3$. Subsequently, a thin 10 nm $SiO_2$ layer was thermally grown on the top surface of the Si. Thermal evaporation was used to deposit 400-nm-thick Ag layers onto each side of the membrane, forming both the plasmostor cladding and the gate contact. Subwavelength slits are etched into the top and bottom cladding layers, which slits define a distance d representing a source-drain length. Light was coupled into and out of the plasmostor via the subwavelength slits, using one slit as an optical source and the other as an optical drain. FIG. 1(*b*) is a scanning electron micrograph of the PlasMOStor as viewed from the optical source side. This double-sided coupling configuration provides for a dark-field imaging configuration with minimal background signal, though end-fire excitation could also be used. Note that in this geometry, the slits function as the optical source (input) and drain (output) of the plasmostor. As seen in FIG. 1(*b*), the input slits are defined to a length of approximately 4 µm, which determines the lateral extent of waveguided modes. The optical drain is visible due to electron transparency. The inset at the upper left corner of FIG. 1(*b*) shows a cross-sectional cut through the 4-layer plasmostor waveguide, in which the scale bar is 500 nm. To map transmission as a function of device length, the source-drain separation was varied from approximately 1-8 µm in 50 nm increments.

Figure 2A:
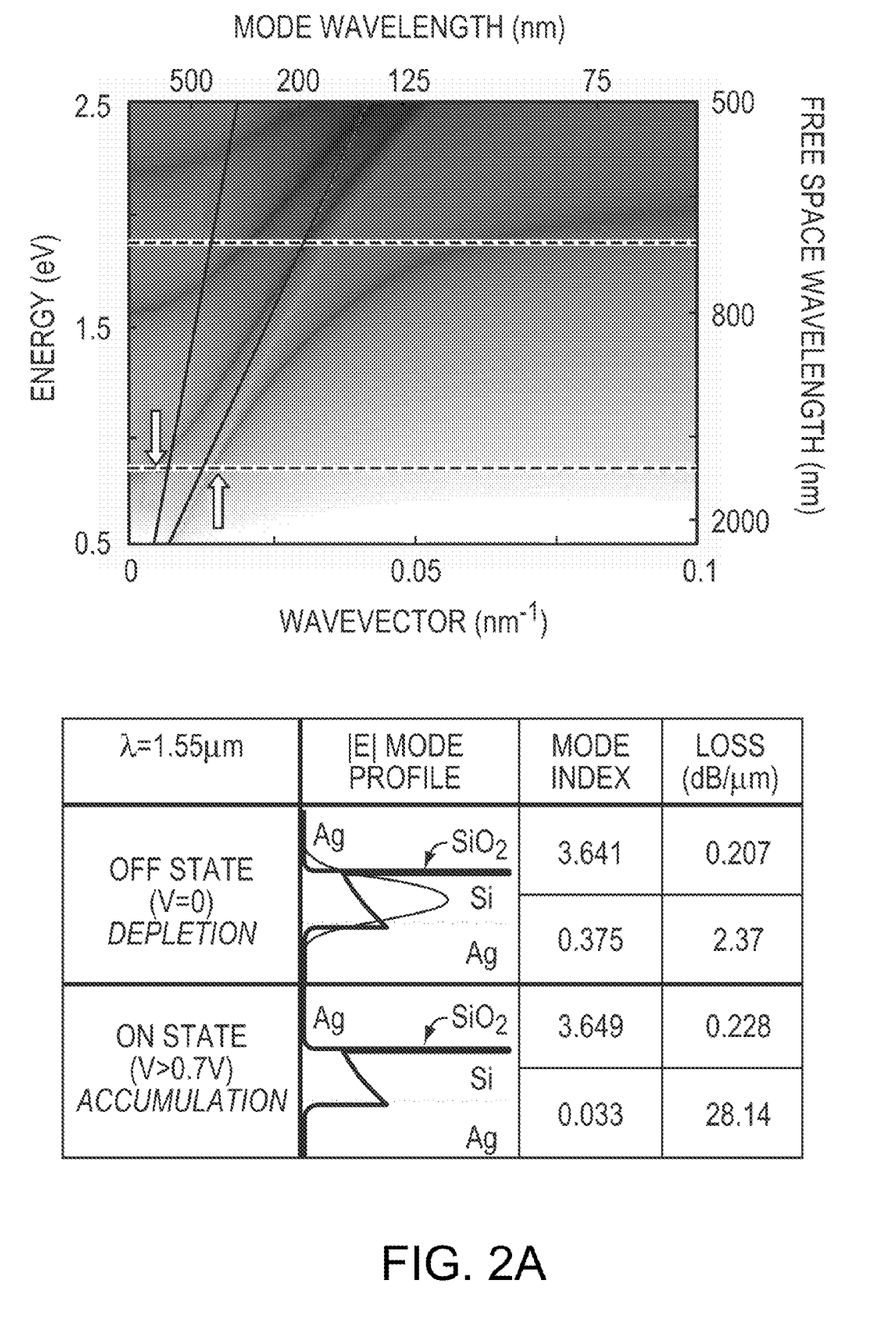
FIG. 2(a) is a diagram showing the dispersion relations and tabulated mode properties of the plasmostor, according to the invention.

In the absence of an applied field at the gate, the plasmostor is fully depleted and light can be guided from the source to the drain through both the Si and $SiO_2$ layers. FIG. 2(*a*) illustrates the dispersion diagram and mode profiles that characterize the unbiased plasmostor waveguide. Modal properties were calculated via a numerical solution of Maxwell's equations and assume uniform coupling across the waveguide stack. The dark grey curves correspond to optimal dispersion relation solutions with the grey scale indicating the mode line width. Light lines for $SiO_2$ (the black solid line) and Si (the light solid line) are also included in the dispersion diagram, corresponding to light propagation through bulk media with refractive index $n=n_{SiO2}$ or $n_{Si}$, respectively. As we describe below, the thickness of the semiconductor layer, here silicon, can be used to select the wavelength of light having a desired plasmonic mode or plasmonic response, or to "tune" the device to support a plasmonic mode or plasmonic response at a selected wavelength.

In FIG. 2(*a*), the horizontal dashed lines indicate free-space wavelengths of $\lambda=1.55$ µm (lower line) and $\lambda=685$ nm (upper line). As seen in FIG. 2(*a*), the plasmostor supports a variety of transverse magnetic modes. In particular, at a wavelength of $\lambda=1.55$ µm, the unbiased plasmostor supports two modes. The first is a photonic mode lying to the left of the Si and $SiO_2$ light lines (denoted by the arrow pointing down). The second is a plasmonic mode lying to the right of the Si light line (denoted by the arrow pointing up). Both modes will be generated at the plasmostor source and can interfere either constructively or destructively at the drain, depending on the source-drain separation. The Table in FIG. 2(*a*) presents mode profiles, refractive indices and losses for the plasmostor in both depletion (voltage-off, or Off state) and accumulation (voltage-on, or On state) states at a wavelength of $\lambda=1.55$ µm. As seen in the Table shown in FIG. 2(*a*), the photonic mode (lower set of numbers for each of Off state and On state) is characterized by an electric field localized predominately in the Si core and a mode index of n=0.375 in the Off state. The curves shown in the column labelled |E| mode profile are the plasmonic mode (which is essentially invariant) and the photonic mode (which changes between the Off state and the On state). The plasmonic mode (upper set of numbers for each of Off state and On state) exhibits maximal field intensities within the $SiO_2$ channel and a mode index of n=3.641 in the Off state. While the high plasmonic mode index arises from mode overlap with the Ag and Si layers, propagation losses remain relatively low. At $\lambda=1.55$ µm, losses of the plasmonic and photonic modes in the Off state are 0.207 dB/µm and 2.37 dB/µm, respectively. Losses of the plasmonic and photonic modes in the On state are 0.228 dB/µm and 28.14 dB/µm, respectively. For both modes, fields in the metal cladding decay within approximately 20 nm of the Ag—Si and Ag—$SiO_2$ interfaces.

The nearly-flat dispersion of the photonic mode around $\lambda=1.55$ µm suggests that this mode will be extremely sensitive to changes in the Si complex index. For example, modifying the Si index through free-carrier absorption will push this mode into cutoff, such that the dispersion curve intercepts the energy axis just above $\lambda=1.55$ µm. The remaining plasmonic mode will then propagate through the plasmostor without interference from the photonic mode.

In the plasmostor, such changes in the Si index are induced by applying a positive bias to the gate. For drive voltages above the flat-band voltage, electrons in the n-type Si form an accumulation layer characterized by a peak carrier concentration at the Si/$SiO_2$ interface and a spatial extent given by the Debye length. The Table in FIG. 2(*a*) tabulates the theoretical change of mode index and propagation length with the onset of accumulation. To represent the spatially-varying charge distribution predicted by Poisson's equation, the accumulation layer is modeled as five discrete Drude layers of varying conductivity, with an average plasma frequency of $7.94 \times 10^{14}$ Hz and a Debye decay length of 14 nm. Note that both the Drude model and the Debye approximation were used for simplicity. As expected, the effective index and losses of the plasmonic mode exhibit very little change between the voltage-off (depletion) and voltage-on (accumulation) states. In particular, the plasmonic mode index varies from the off state by $\Delta n=0.008$, and losses are only slightly increased to 0.228 dB/µm. However, the photonic mode is pushed into cutoff, as indicated by the near-zero mode index and substantially increased losses (i.e., the photonic mode becomes evanescent and can no longer propagate power through the device). Therefore, in the accumulation state, the plasmostor will guide near-infrared light almost exclusively through the $SiO_2$ channel, solely via the plasmonic mode.

Figure 2B:
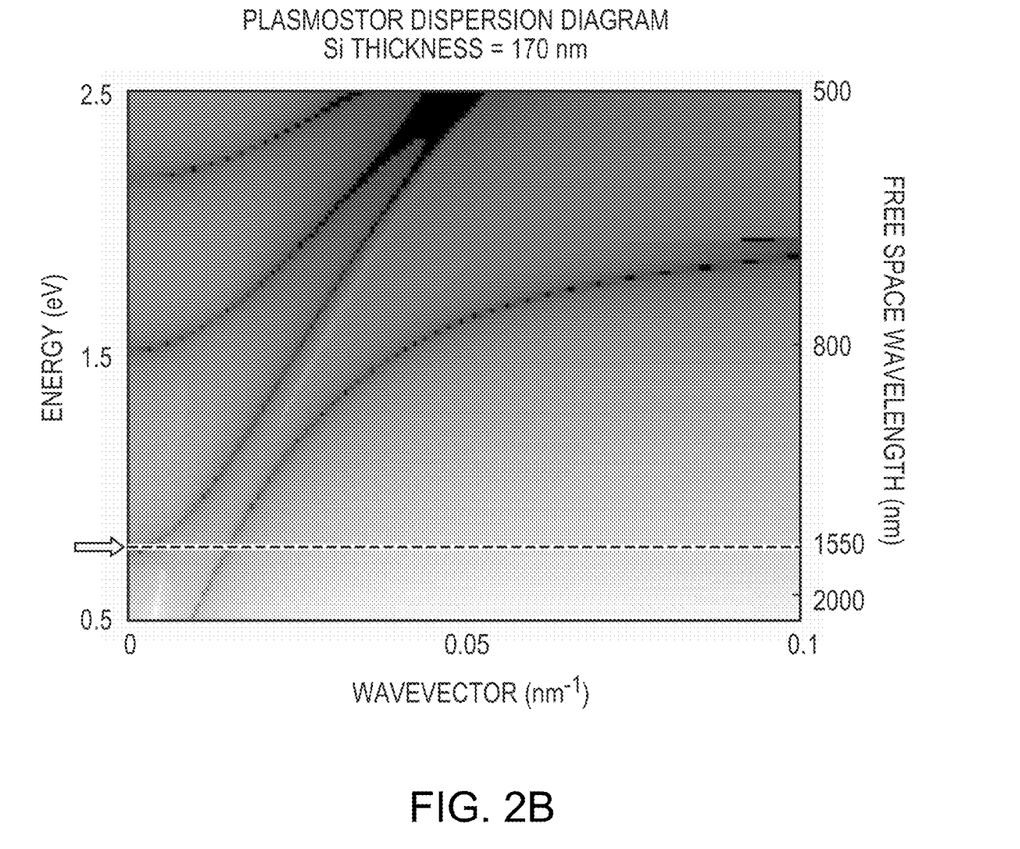
FIG. 2(b) is a diagram showing the dispersion relations for a 170 nm thick silicon layer, illustrating a photonic mode cutoff frequency at approximately 0.80 eV (approximately 1550 nm).

FIG. 2(*b*) is a diagram showing the dispersion relations for a 170 nm thick silicon layer, illustrating a photonic mode cutoff frequency at approximately 0.80 eV (approximately 1550 nm), indicated by the arrow. FIG. 2(*b*) is similar to FIG. 2(*a*).

Figure 3:
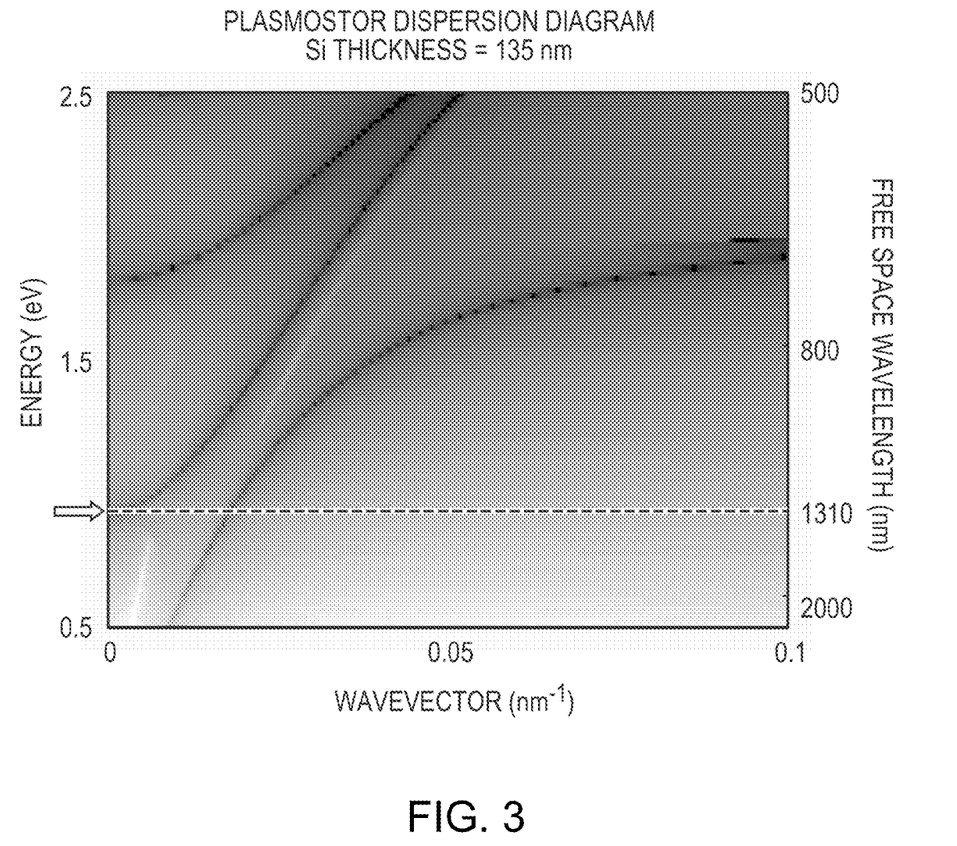
FIG. 3 is a diagram showing the dispersion relations for a 135 nm thick silicon layer illustrating a photonic mode cutoff frequency at approximately 0.94 eV (approximately 1310 nm).

FIG. 3 is a diagram showing the dispersion relations for a 135 nm thick silicon layer illustrating a photonic mode cutoff frequency at approximately 0.94 eV (approximately 1310 nm), indicated by the arrow. FIG. 3 is based on a calculation which illustrates how the mode cutoff depends on the thickness of the silicon layer. FIG. 3 suggests that one could use the variation of silicon thickness to design a plasmostor optimized for 1310 nm. Equivalently, other thicknesses of silicon would allow the design and fabrication of plasmostor devices optimized for other wavelengths, such as 1480 nm.

Figure 4A:
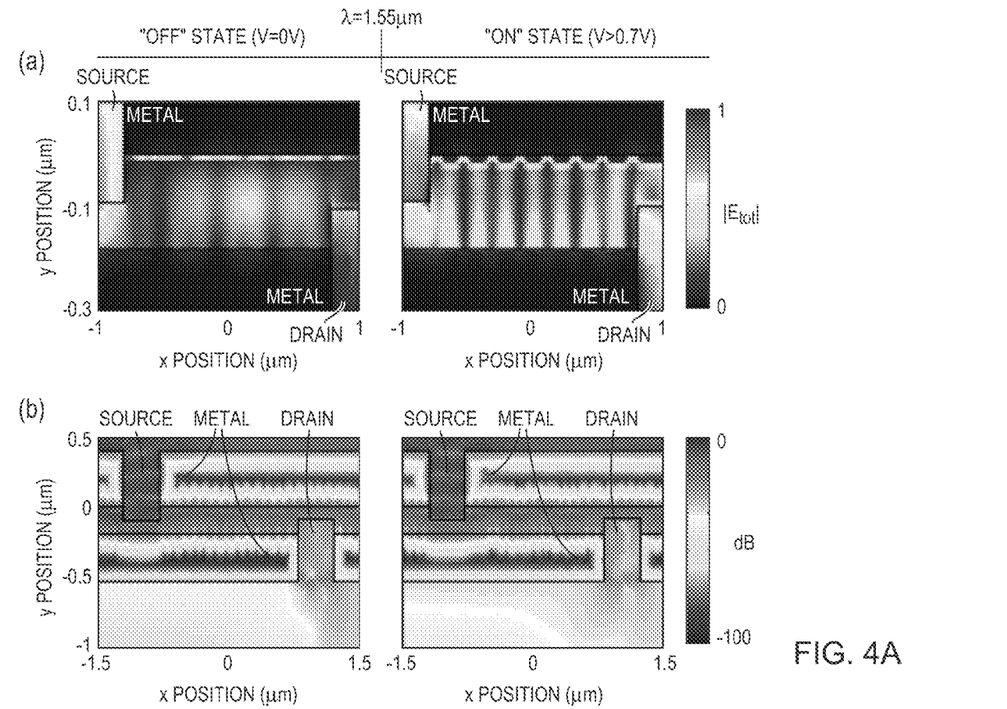
FIG. 4 is a diagram illustrating a number of finite difference time domain simulations of the plasmostor, showing the total electric field and the transmitted power for a 2 µm-long optical source-drain separation.
Figure 4B:
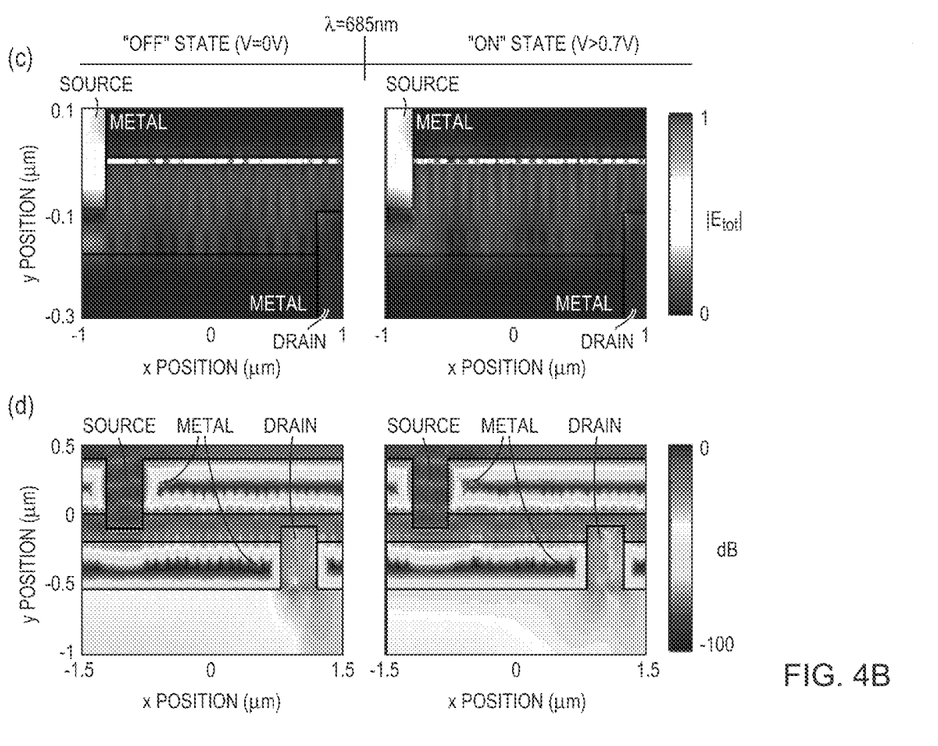

FIG. 4 is a diagram illustrating a number of finite difference time domain simulations of the plasmostor, showing the total electric field and the transmitted power for a 2-µm-long optical source-drain separation (d=2 µm). All panels correspond to the same plasmostor geometry, illuminated through the optical source with a Gaussian beam of wavelength $\lambda$=1.55 µm (panels a and b) or $\lambda$=685 nm (panels c and d). The slits are centered at x=±1 µm, with the Ag/air interfaces located at y≈±0.5 µm. The electric field (panels a and c) and power (panels b and d) are monitored in both the voltage-off (depleted) and voltage-on (accumulated) states at each wavelength. The accumulated plasmostor state is modelled by modifying the unbiased Si permittivity with a spatially-varying Drude permittivity that reflects the increased charge concentration. As shown in FIG. 4(a), for a plasmostor excitation with $\lambda$=1.55 µm illumination and no applied gate bias (left column), the fields are distributed throughout the Si core with sparse regions of high electric field in the oxide slot. However, with the onset of accumulation (right column), the Si-core mode is cutoff and fields are predominately confined to the thin $SiO_2$ slot. As shown in FIG. 4(b), by monitoring the power profiles in both the voltage-off (left column) and voltage-on (right column) states, a 10 dB increase in output power can be seen in the on (accumulated) state. As shown in FIG. 4(c) and FIG. 4(d), at $\lambda$=685 nm, increased Si losses and multiple plasmostor modes decrease the observed field and power modulation between the voltage-off (left column) and voltage-on (right column) states.

In the simulations shown in FIG. 4, the plasmostor is illuminated through the optical source with a Gaussian beam of wavelength $\lambda$=1.55 µm or $\lambda$=685 nm. As seen in the left column of FIG. 4a, in the absence of an applied field, plasmostor transmission at $\lambda$=1.55 µm is distributed throughout the Si core with sparse regions of high electric field in the oxide slot. However, with the onset of accumulation, the field transmitted within the Si core is notably decreased. As seen in the right column of FIG. 4(a), plasmostor fields are localized predominately within the 10-nm-thick oxide layer, which acts as a channel between the optical source and optical drain. Within the slot, pronounced maxima and minima within the resonator can be observed with a wavelength of approximately 225 nm.

By choosing the source-drain separation to correspond to a condition of destructive interference between the photonic and plasmonic modes, plasmostor transmission can be substantially increased by inducing accumulation. FIG. 4(b) plots the total power transmitted through the plasmostor at $\lambda$=1.55 µm, with d=2 µm. Comparing intensities at the optical drain between the voltage-off and voltage-on states, simulated modulation ratios exceeding +10 dB can be observed.

As wavelengths approach the visible range, the plasmostor begins to support a number of photonic and plasmonic modes (see FIG. 2(a)). At $\lambda$=685 nm, for example, the unbiased plasmostor exhibits three modes with effective indices of n=5.36, 3.40, and 2.28. An applied field shifts these indices to n=5.35, 3.34, and 2.15. Such multimode behavior is readily visualized in the simulated images of FIGS. 4c and d. However, because Si is more absorbing in the visible, the propagation lengths of these modes do not exceed 3 µm. The accumulation layer induces higher losses in the structure, and modulation between the voltage-off and voltage-off states results almost exclusively from absorption of all modes. The higher absorption and multimode behavior at visible wavelengths suggest that this particular plasmostor design is ideally suited for near-infrared operation.

Figure 5:
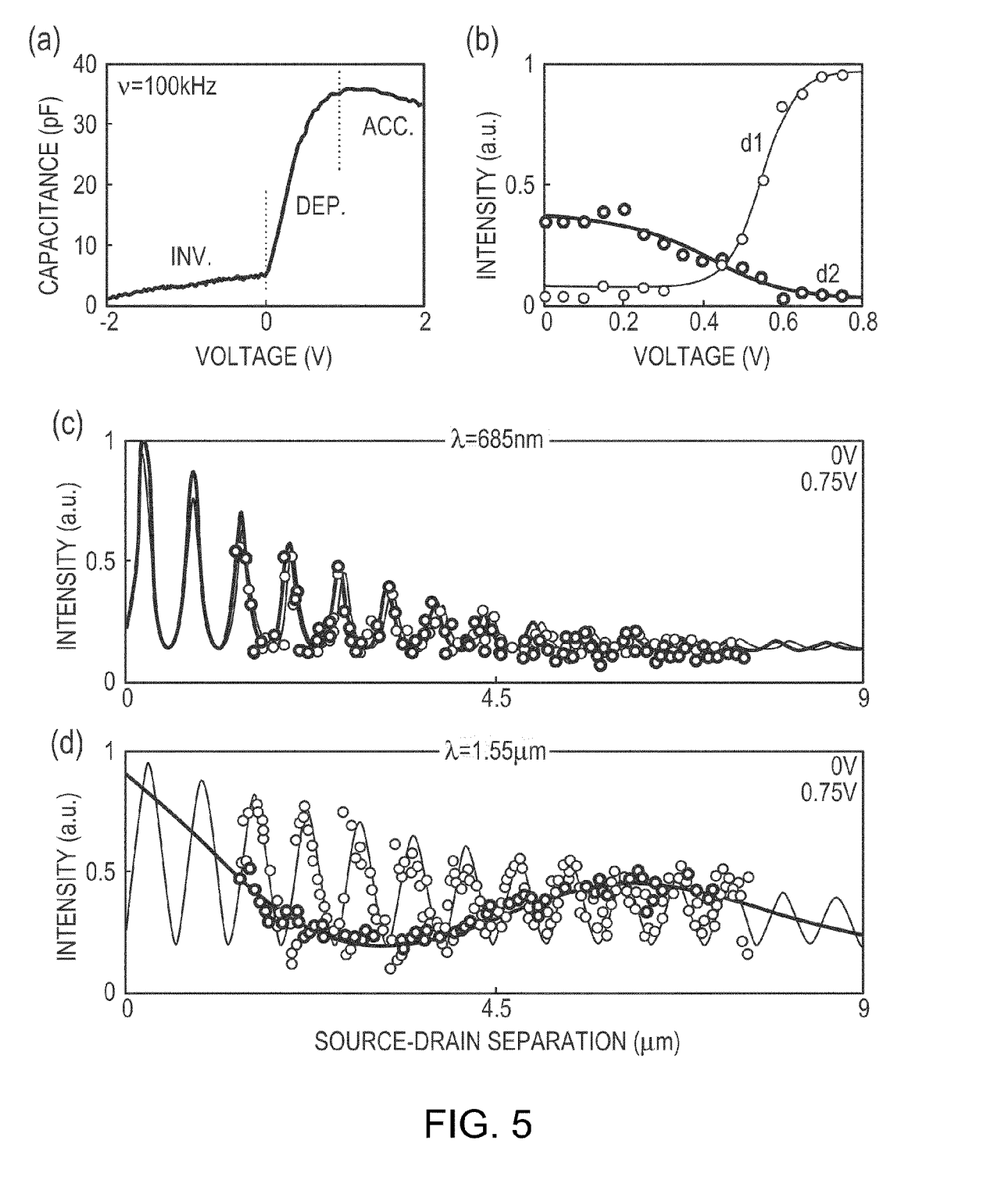
FIG. 5 is a diagram that illustrates the results of some experimental electrical and optical characterization of the plasmostor.

FIG. 5 is a diagram that illustrates the results of some experimental electrical and optical characterization of the plasmostor. FIG. 5(a) is a graph of the high-frequency (100 kHz) capacitance-voltage curve of the modulator over a ~100×100 µm² area, showing that the plasmostor is in inversion for negative biases, depletion for biases between 0 and 0.7 V, and accumulation for voltages exceeding 0.7 V. The flatband-voltage, where the Si is charge-neutral, occurs around 0.5 V. From the total observed accumulation capacitance (35 pF) of this sample region $A_{meas}$, we infer the capacitance of a typical plasmostor with areal dimensions $A_{plasmostor}$=4 µm² as $C_{plasmostor}$=$C_{meas}$×($A_{plasmostor}$/$A_{meas}$)= 14 fF.

FIG. 5(b) illustrates the optical drain intensity as a function of gate bias for two source-drain separations ($d_1$=2.2 µm and $d_2$=7.0 µm) at $\lambda$=1.55 µm. For $d_1$=2.2 µm, the onset of significant modulation occurs around 0.5 V and saturates around 0.7 V, consistent with the accumulation-based operation of the device. The out-coupled intensity from the plasmostor was monitored as a function of gate bias in order to characterize the optical response. An infrared laser source ($\lambda$=1.55 µm) was focused onto a single device and transmission through the optical drain was imaged using a 50× microscope objective coupled to a Ge detector. Depending on the source-drain separation, and hence the interference condition of the photonic and plasmonic modes in the depleted state, transmitted intensity could increase or decrease with applied bias. As seen in FIG. 5(b), a modulator of length $d_1$=2.2 µm exhibits a pronounced intensity increase with increasing positive bias for $\lambda$=1.55 µm. Consistent with the capacitance-voltage curves, modulation saturates around 0.7 V, corresponding to the onset of accumulation. In contrast, a modulator of length $d_2$=7.0 µm exhibits a 30% decrease in transmitted intensity for $\lambda$=1.55 µm.

Full experimental optical characterization was achieved by varying the source-drain separation and the illumination wavelength, both with and without an applied bias. FIG. 5(c) and FIG. 5(d) show plasmostor transmission as a function of resonator length for source wavelengths of 685 nm and 1.55 µm, respectively. Experimental points are shown as open circles, with the radius encompassing the experimental error. Best fits based on resonator theory are shown as solid lines. As seen in FIG. 5(c), at a wavelength of 685 nm, negligible modulation is observed for TM-polarized light between the voltage on and off states of the modulator. For shorter cavity lengths, transmission predominately decreases with applied bias. Cavities longer than 2.5 µm are extinction dominated, consistent with mode propagation lengths derived from calculations.

In contrast, the plasmostor exhibits pronounced modulation for near-infrared sources. As seen in FIG. 5(d), with no applied bias, plasmostor transmission at $\lambda$=1.55 µm is characterized by an output signal comprised of both high and low frequency components. As illustrated by the dispersion diagram of FIG. 2(a), these components correspond to the plasmonic and photonic waveguide modes, respectively. An applied bias of 0.75 V forces the photonic mode into cut-off, leaving only a single, high-frequency mode in the waveguide. Experimentally, the observed propagation length of this mode is in fair agreement the plasmonic mode losses predicted from calculations. The observed mode index is about half the calculated plasmon index, likely due to aliasing effects arising from the chosen optical source-drain separation step-size.

Still, source-drain separations ranging from 1 μm to 8 μm exhibit amplitude modulation ratios ranging between −3.15 dB (at d=7.5 μm) and 4.56 dB (at d=2.6 μm). Moreover, theoretical fits to the experimental data indicate that higher modulation ratios may be possible at shorter source-drain separations. Such observations are consistent with the simulations of FIG. 4. To our knowledge, this plasmostor yields one of the highest reported near-infrared Si modulation depths in the smallest reported volume, with device volumes as small as one half of a cubic wavelength.

Plasmostor modulation depths remain high for wavelengths spanning from 1.48 μm to 1.58 μm (the range of our infrared source), where changes in the complex refractive index of Si induce cut-off of the photonic mode. For these wavelengths, significant modulation is preferentially observed in shorter resonator lengths (d<3 μm), which in the depleted state produce destructive interference between the photonic and plasmonic modes. Previous Si modulators based on MOS capacitors, in contrast, require device lengths on the order of millimeters. Interestingly, the internal waveguide propagation losses of the plasmostor are not significantly higher than 1 dB (for a source-drain separation of d=2.2 μm, the plasmonic mode has a propagation loss of 0.5 dB). Thus, despite the higher losses generally associated with plasmonic components, the plasmostor exhibits propagation losses that are comparable with traditional Si- or dielectric-based modulators.

We note that the prototype plasmostor reported here incurs additional losses from mode insertion and extraction through the 'source' and 'drain' slits employed in our device. Using full field electromagnetic simulations, we calculate an insertion loss of −12.8±0.1 dB and an extraction loss of −3±1 dB. Combined with the waveguide propagation losses, then, this prototype plasmostor exhibits a total on-chip loss of approximately −17 dB, in rough accord with the total experimentally-determined loss of approximately −20 dB. However, we do not consider these high coupling losses intrinsic to device operation, since slit coupling is not fundamental to plasmostor modulation. In fact, our simulations indicate that by modifying the coupling geometry to simple, non-optimized end-fire excitation from a Si-waveguide, an increased coupling efficiency of 36% (coupling losses of 4.4 dB) can be achieved. Moreover, as reported by Veronis and Fan (Veronis, G. and Fan, S. *Optics Express* 2007, 3, 1211-1221 (2007)), optimization techniques have been proposed to achieve >90% incoupling efficiencies into plasmonic waveguides, corresponding to coupling losses as low as 0.3 dB. Thus, future plasmostors with a device length of approximately 2 microns and more optimal incoupling could achieve overall "on" state losses as low as 1.1 dB.

The frequency response of the plasmostor was characterized by applying a 4 V, 100 kHz pulse train to the modulator with a rise-time of 10 ns. Plasmostor switching was determined to be at least as fast as 10 ns, which was limited by the frequency response of our pulse generator. We note, however, that modulation speeds of a plasmostor are likely to be fundamentally limited by the speed of formation of the MOS accumulation layer, as is true in a conventional small-geometry MOSFET. Accordingly, plasmostor operation should be compatible with GHz modulation frequencies.

To explore the potential for GHz modulation in more detail, we conducted circuit simulations of our plasmostor driven into accumulation by optical means. For example, a photodiode connected to the plasmostor gate could provide sufficient power to modulate the channel properties. Provided the photodiode could produce gate voltages exceeding 0.7 V, this coupled plasmostor-photodiode system could form the basis for all-optical MOS-based modulation. FIG. 6(a) illustrates such a scheme for all-optical modulation. Here, the plasmostor is modelled using the experimentally-inferred capacitance (14° F.) of a typical 4 μm² device. Similarly, the photodiode is modelled using circuit parameters from state-of-the-art small photodiodes exhibiting quantum efficiencies of 10% under 6 mW optical illumination.

FIG. 6(a) is an equivalent circuit diagram of an illustrative all-optical, SOI-based plasmostor. An ideal photodiode is connected to a load resistor and the plasmostor, forming a 3-terminal device capable of GHz operation. Circuit analysis of the coupled photodiode-plasmostor system was performed by modelling the plasmostor as a MOS capacitor with a capacitance of 14 fF. The load resistance was chosen so that the photodiode provides the appropriate gate bias to the plasmostor. Photodiodes with active areas of 75 μm² and 4 μm² allow system bandwidths (3 dB roll-off frequencies) of 3 GHz and 15 GHz, respectively. Bandwidths could potentially be improved by further decreasing the photodiode size or the modifying the channel thickness. Circuit parameters for the 75 μm² diode, load resistor ($R_l$) and plasmostor MOS capacitor ($C_l$) are: $J_o$=0.6 mA, $C_p$=66 fF, $R_s$=32Ω, $R_l$=1200Ω, $C_l$=14 fF. Parameters for the 4 μm² diode, resistor, and plasmostor are: $J_o$=0.6 mA, $C_p$=2 fF, $R_s$=50Ω, $R_l$=1200Ω, $C_l$=14 fF.

Further improvements could be achieved by varying the oxide thickness or the plasmostor gate length. Moreover, by tuning the magnitude of the optical carrier ($\lambda_1$) and signal ($\lambda_2$) sources, this coupled photodiode-plasmostor system could exhibit signal gain at the plasmostor drain. This three-terminal, integrated optical device requires no electronic conditioning and can be fabricated from SOI waveguide technology, using, for instance, local oxidation of silicon (LOCOS) processing. Such processing would facilitate CMOS compatibility while minimizing optical insertion losses.

FIG. 6(b) is a schematic perspective diagram of an SOI-based all-optical plasmostor. Note that the dimensions of this device could reach subwavelength scales. As seen, a Ge p-i-n photodiode is connected to the plasmostor in parallel with a dielectric (a resistor). In the illustrative diagram, it is envisioned that a signal to be controlled having wavelength $\lambda_1$ passes from left to right in the plasmostor from a source waveguide at the left to a drain waveguide at the right, and a gate signal having wavelength $\lambda_2$ is provided by a silicon waveguide at the top of FIG. 6(b) to the Ge photodiode that provides the modulation signal to the plasmostor. By providing a plurality of plasmostor devices, each designed to be optimized for a specified wavelength, such as a selected one of 1310 nm, 1480 nm, and 1550 nm, it is expected that one can build a system that would operate at one or more wavelengths, for example as does the well known fiber-optic-based telecommunication system that can provide voice, data and video signals simultaneously.

The plasmostor offers a unique opportunity for compact, Si-based field effect optical modulation using scaled electronic MOSFET technology. The empirically-determined switching voltage (0.7 V) and capacitance (14 fF) yield a required switching energy of $E=CV^2$=6.8 fJ for a typical 4 μm² plasmostor device, commensurate with existing CMOS and optical logic gates. To our knowledge, the plasmostor achieves the first electrical amplitude modulation of light in a plasmon waveguide. Furthermore, by modulating optical signals with a photodiode coupled to the gate, the plasmostor promises potential for opto-electronic and perhaps even all-optical Si-based modulation.

Operation of a Three Terminal Device

Figure 6:
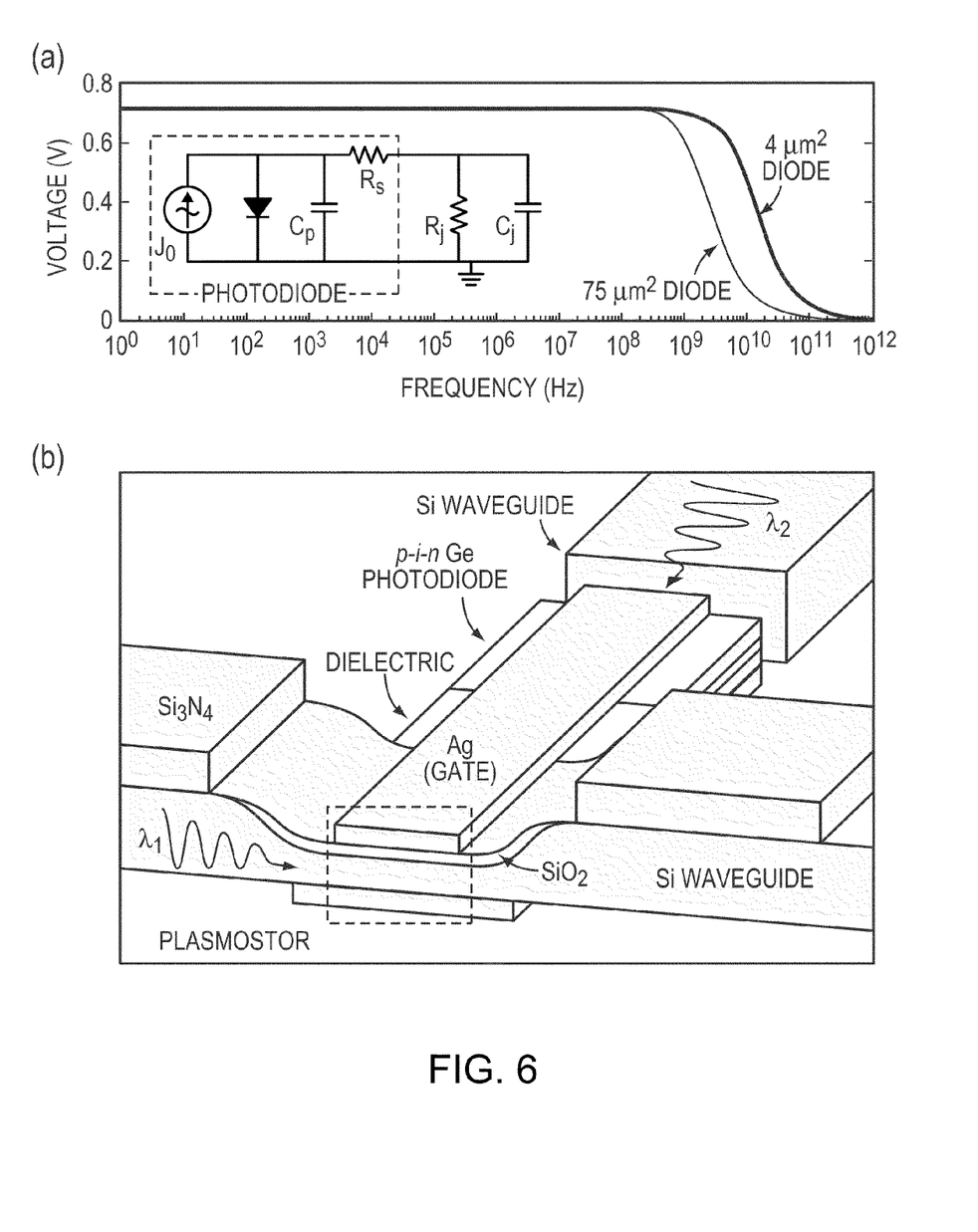
FIG. 6(a) is an equivalent circuit diagram of an illustrative SOI-based all-optical plasmostor.
FIG. 6(b) is a schematic perspective diagram of an SOI-based all-optical plasmostor.

Referring to FIG. 6, in which a three terminal all-optical modulator comprising a plasmostor device is illustrated, we now describe the operation of the three terminal device to handle information, such as voice information, data information and video information. For a plasmostor designed to have a structure designed to operate using an optical signal that can carry information at a wavelength $\lambda_1$, for example a selected one of 1310 nm, 1480 nm, and 1550 nm, and to operate using a gate signal wavelength $\lambda_2$ that is selected to match the absorption characteristics of the photodetector, which is shown as a Ge p-i-n photodetector, but which might be a photodetector based on other materials. The optical signal at wavelength $\lambda_1$ is provided from a source such as a telecommunication apparatus operating using a fiber optic connection. The optical signal at wavelength $\lambda_1$ is originally devoid of information. The information to be carried by the optical signal at wavelength $\lambda_1$ is provided by a source, such as a user of the telecommunication system. The information to be carried by the optical signal at wavelength $\lambda_1$ is provided as information at the gate wavelength $\lambda_2$. In some embodiments, the user is a person, and in some embodiments, the user is an apparatus based on a general purpose computer programmed with software that can accept input and that can convert that input to digital information to be transmitted to another user of the system.

In the three terminal all-optical modulator of FIG. 6, the gate signal at the gate wavelength $\lambda_2$ causes the photodetector to generate electrical signals that are applied to the two conductive contacts or terminals of the plasmostor so as to modulate the optical signal at wavelength $\lambda_1$ that is introduced at the source of the plasmostor. The optical signal at wavelength $\lambda_1$ is modulated as it passes through the plasmostor, and the modulated signal exits at the drain of the plasmostor. The modulated signal can be transmitted to a receiving user by way of a conventional optical fiber or via a communication system based on optical fibers as the transmission medium. A resistor is provided in parallel with the photodetector so that when the photodetector is not generating a signal, the signal previously placed across the two conductive contacts or terminals is rapidly dissipated by conduction through the resistor. As described hereinabove, the resistor can be selected to provide a three terminal all-optical modulator having an operational response in the range of GHz. No external electrical signals are required to operate the three terminal all-optical modulator. For multiple optical signal paths, it is contemplated that one can provide multiple plasmostors, one per path.

The embodiments described herein have been expressed using silicon as the semiconductor layer, $SiO_2$ as the dielectric layer adjacent the semiconductor layer, and silver as the conductive layer adjacent each of the semiconductor and the dielectric layers. It should be apparent to those of ordinary skill in the art that other well-known semiconductor materials, other well-known dielectric materials, and other well-known metals or conductors might be substituted for the respective semiconductor, dielectric and conductive layer materials from which a plasmostor might be constructed, provided that suitable design changes were also applied, as has been explained herein. It has been explained that a germanium p-i-n photodiode might be used as a structure provided to generate the required electrical signals to the metal layers in response to an optical gate signal. It should be apparent to those of ordinary skill in the art that other well-known photodiodes or photodetectors might be substituted for the germanium p-i-n photodiode. It has been explained that in the embodiments reduced to practice, slits were opened in the metallic contact layers to provide source and drain openings, that is, an input optical terminal and an output optical terminal. However, it has also been explained that other structures, such as waveguides, for example silicon waveguides, are believed to be useful to provide source and drain terminals. It is further contemplated that it could be possible to use an opening in a metallic layer as one of the source and drain, and a semiconductor waveguide as the other of the source and drain in a device.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

General Purpose Programmable Computers

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of Unix, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A two terminal optical apparatus, comprising:
    a substrate configured to support a semiconductor membrane having a thickness defined by a first surface and a second surface, said first surface and said second surface oriented in substantially parallel configuration; said semiconductor layer having an optical input terminal for an input optical signal and an optical output terminal for an output optical signal;
    a dielectric layer having a thickness defined by a first surface and a second surface, said first surface and said second surface oriented in substantially parallel configuration, said second surface of said dielectric layer adjacent said first surface of said semiconductor membrane, said second surface of said dielectric layer and said first surface of said semiconductor membrane configured to provide an interface capable of supporting a plasmonic wave;
    a first conductive layer adjacent said first surface of said dielectric layer, said first conductive layer configured as an electric contact; and
    a second conductive layer adjacent said second surface of said semiconductor layer, said second conductive layer configured as an electric contact;
    whereby said optical apparatus is configured carry a plasmonic wave in response to the application of an electrical signal across said first conductive layer and said second conductive layer and the application of an input optical signal at said optical input terminal and to provide a modulated optical signal as said output optical signal at said optical output terminal.

2. The two terminal optical apparatus of claim 1, wherein said semiconductor membrane comprises silicon.

3. The two terminal optical apparatus of claim 1, wherein said thickness of said semiconductor membrane is configured to select a wavelength of light to have a desired plasmonic response.

4. The two terminal optical apparatus of claim 3, wherein said wavelength of light selected to have a desired plasmonic response is a wavelength of light used in communication by way of an optical fiber.

5. The two terminal optical apparatus of claim 4, wherein said wavelength of light used in communication by way of an optical fiber is a selected one of 1310 nm, 1480 nm and 1550 nm.

6. The two terminal optical apparatus of claim 1, wherein said dielectric layer comprises silicon and oxygen.

7. The two terminal optical apparatus of claim 1, wherein at least one of said first conductive layer and said second conductive layer further comprise an opening defined therein, said opening in said conductive layer configured to provide a selected one of an optical input terminal and an optical output terminal.

8. A three terminal optical apparatus, comprising:
    said two terminal optical apparatus of claim 1, and further comprising:
        a third optical terminal configured as a gate optical input for a gate signal representing information;
        a photodetector configured to receive said gate optical signal from said third optical terminal, said photodetector configured to apply an electrical signal responsive to said gate optical signal across said first conductive layer and said second conductive layer; and
        a resistor in parallel with said terminals of said photodetector.

9. A method of modulating an optical signal, comprising the steps of:
    providing a three terminal optical apparatus having:
        a substrate configured to support a semiconductor membrane having a thickness defined by a first surface and a second surface, said first surface and said second surface oriented in substantially parallel configuration; said semiconductor layer having an optical input terminal for an input optical signal and an optical output terminal for an output optical signal;
        a dielectric layer having a thickness defined by a first surface and a second surface, said first surface and said second surface oriented in substantially parallel configuration, said second surface of said dielectric layer adjacent said first surface of said semiconductor membrane, said second surface of said dielectric layer and said first surface of said semiconductor membrane configured to provide an interface capable of supporting a plasmonic wave;
        a first conductive layer adjacent said first surface of said dielectric layer, said first conductive layer configured as an electric contact;
        a second conductive layer adjacent said second surface of said semiconductor layer, said second conductive layer configured as an electric contact;
        a third optical terminal configured as a gate optical input for a gate signal representing information;
        a photodetector configured to receive said gate optical signal from said third optical terminal, said photodetector configured to apply an electrical signal responsive to said gate optical signal across said first conductive layer and said second conductive layer; and
        a resistor in parallel with said terminals of said photodetector;
    applying a gate signal representing information to said third optical terminal;
    applying to said optical input terminal an input optical signal to be modulated; and retrieving an output optical signal representing said input optical signal modulated with said information.

10. The method of modulating an optical signal of claim 9, wherein said input optical signal has a wavelength of light used in communication by way of an optical fiber.

11. The method of modulating an optical signal of claim 10, wherein said input optical signal has a wavelength selected from the group consisting of 1310 nm, 1480 nm and 1550 nm.

12. The method of modulating an optical signal of claim 9, wherein said gate signal representing information comprises information provided by a user.

13. The method of modulating an optical signal of claim 12, wherein said user is a person.

14. The method of modulating an optical signal of claim 12, wherein said user is an apparatus based on a general purpose computer programmed with software.

15. The method of modulating an optical signal of claim 12, further comprising the step of transmitting said retrieved output optical signal by way of an optical fiber.

16. The method of modulating an optical signal of claim 12, further comprising the step of storing said retrieved output optical signal for later use.

17. The method of modulating an optical signal of claim 12, further comprising the step of displaying said retrieved output optical signal to a user.

18. The method of modulating an optical signal of claim 9, wherein said modulation is performed at frequencies up to 3 GHz.

19. The method of modulating an optical signal of claim 9, wherein said modulation is performed at frequencies up to 15 GHz.

20. The method of modulating an optical signal of claim 9, wherein at least one of said input optical signal and said output optical signal is communicated to or from said three terminal optical apparatus, respectively, by way of a telecommunication system.

* * * * *